No. 749,505. PATENTED JAN. 12, 1904.
G. E. TREGURTHA.
VARIABLE SPARKING MECHANISM.
APPLICATION FILED JUNE 18, 1903.
NO MODEL. 2 SHEETS—SHEET 2.
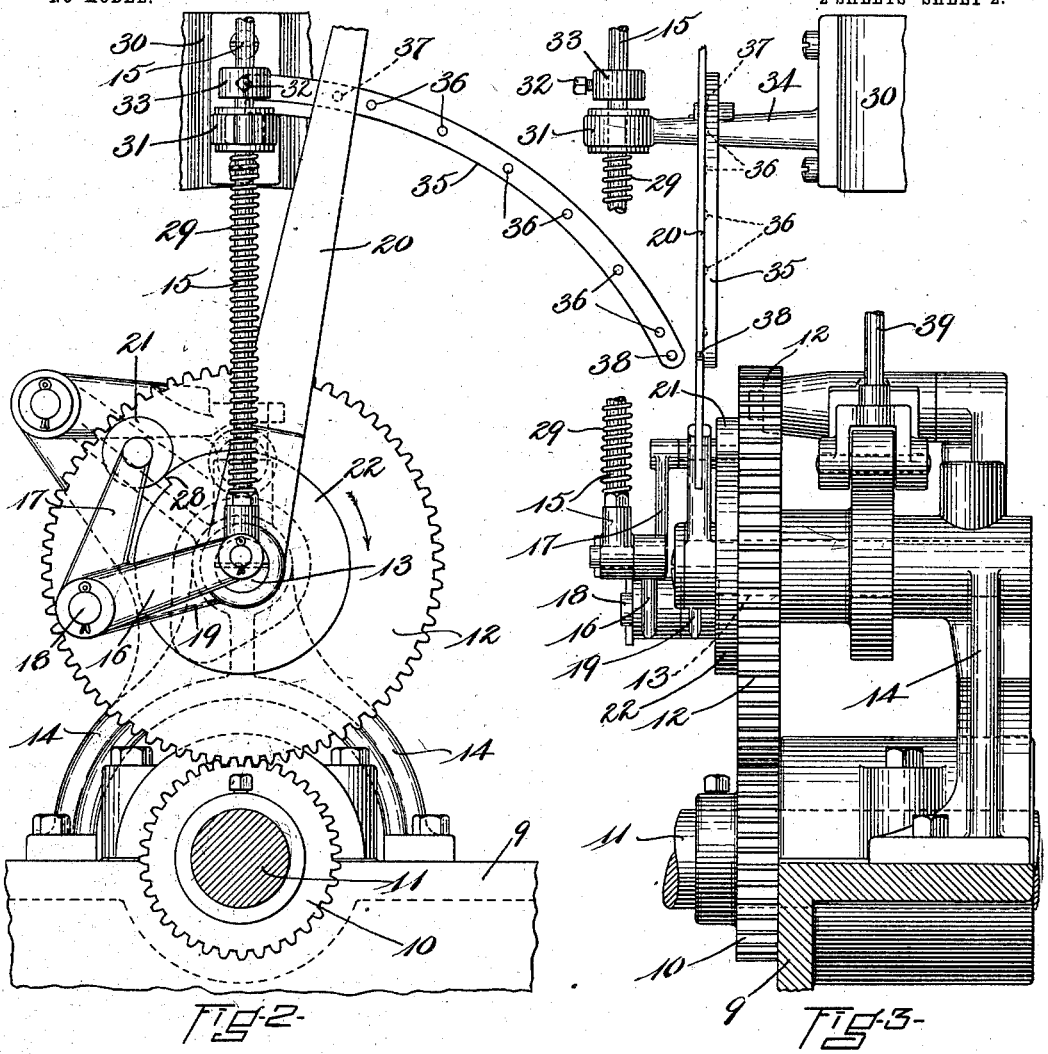
WITNESSES:
Aline Trass
Oscar F. Hill
INVENTOR:
George E. Tregurtha
by William A. Copeland
Attorney No. 749,505. Patented January 12, 1904.

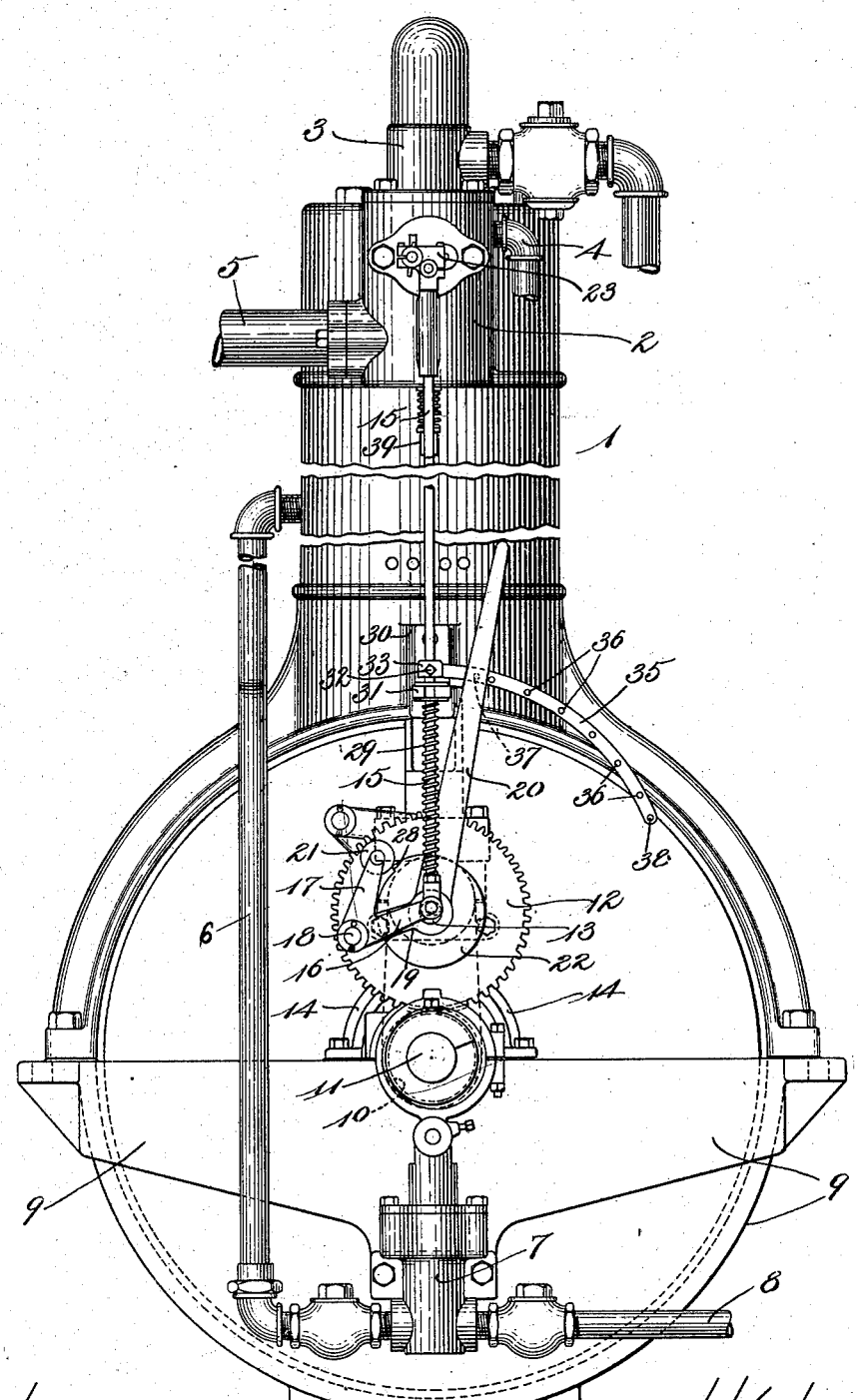

UNITED STATES PATENT OFFICE.

GEORGE E. TREGURTHA, OF MALDEN, MASSACHUSETTS.

VARIABLE SPARKING MECHANISM.

SPECIFICATION forming part of Letters Patent No. 749,505, dated January 12, 1904.

Application filed June 18, 1903. Serial No. 161,960. (No model.)

*To all whom it may concern:*

Be it known that I, GEORGE E. TREGURTHA, of Malden, in the county of Middlesex and State of Massachusetts, have invented certain new and useful Improvements in Variable Sparking Mechanism, of which the following is a specification.

This invention relates especially to engines which are operated by the explosion at predetermined intervals of a mixture of gas or gasolene vapor and air within the cylinder or a chamber connected with the cylinder. This explosion is usually occasioned by an electric spark which is produced by certain mechanism which makes and breaks connection between two contact-points, the spark being produced when the points separate. As usually constructed one of the points is fixed and one is movable, the movable one being controlled by the movement of a shaft or rod called the "igniter-rod." It is desirable that the ignition should occur about the time when the piston reaches its highest point—that is, either shortly before or shortly after the time when the piston reaches its highest point or at some intermediate point between those two points. The speed and power of the engine are controlled according to the time at which the ignition takes place. The expansive force is greatest just after the ignition. If the ignition takes place shortly before the piston reaches its highest point, the expansive force will act upon the piston during its entire descent, and the longer the distance through which it acts the greater will be the power and speed. The speed is slowest when the ignition takes place after the piston has reached its highest point, because the expansive force has less distance through which to act. The speed may be varied by changing the point of ignition between the two extremes.

The special object of the present invention is to provide means for thus varying the time of ignition, and therefore the invention is shown as embodied in apparatus attached to a gas-engine; but it is to be understood that the claims are not to be limited to such use.

The invention will now be fully described, and the novel features thereof will be particularly pointed out in the claims at the close of the specification.

In the drawings, Figure 1 is a front elevation of an engine with apparatus embodying the invention attached and in position, the igniter-rod being in its highest position, the points in contact, and the cam-roll just about to drop off of the cam which actuates the igniter-rod to separate the points, and thereby make the spark, the highest position being indicated by dotted lines. Fig. 2 is an enlarged front elevation of the variable mechanism shown in Fig. 1, the parts being in the same position as in Fig. 1. Fig. 3 is a side elevation of Fig. 2 viewed from the right-hand side of Fig. 2. Fig. 4 is an inside view of the igniting device within the compression-space of the engine. Fig. 5 is a side elevation of the igniting device seen from the left of Fig. 4.

Referring now to the drawings, the engine shown represents one of the four-stroke or two-revolution cycle marine engines, in which 1 represents the cylinder; 2, the cylinder-head, which incloses the compression-chamber and valves and igniter.

3 represents the inlet-valve stand, 4 the outlet for the cooling-water, 5 the exhaust-pipe, and 6 the water-supply pipe which is connected to the pump 7.

8 is a pipe which connects with the water outside of the boat, through which water is taken by the pump for circulation.

9 is the bed to which the pump is attached and to which the cylinder 1 is bolted.

The driving or primary gear 10 is mounted on crank-shaft 11 and meshes with the secondary gear 12, which is mounted on a stud 13, which is held rigidly in the cam-stand 14, the said cam-stand being rigidly secured to the bed 9.

The driving-gear 10 makes two revolutions to one of the secondary gear 12. The apparatus thus far described is well-known.

The igniter-rod 15 is pivotally connected at its lower end with arm 16 of a bell-crank lever 16 17, which is fulcrumed on the stud 18, said stud 18 projecting from the arm 19 of the adjusting-lever 20, which will be more particularly described hereinafter.

Carried on a stud (not shown because behind the other parts) which projects from the inner face of the arm 17 at its outer end is a cam-roll 21, which during a part of the revolution of cam 22 runs in contact with the periphery of said cam 22, fixed to the face of gear 12, so as to revolve with said gear in the direction of the arrow. The rotation of the cam 22 causes the bell-crank lever 16 17 to rock on its fulcrum 18, and thereby raise and lower the igniter-rod 15. The rod 15 at its upper end is elastically connected with the rocker-arm 23, which carries the movable electrode 24, having near its outer end the platinum wire 25, which is adapted to contact with one of the wires 26 of the fixed electrode 27. The form of the cam is such that the igniter-rod 15 will begin to rise about one-eighth of a revolution before the point 28 on the cam 22 reaches the cam-roll 21, thus bringing the movable electrode 24 into contact with the fixed electrode 27, as shown in Fig. 4, before the cam-roll 21 drops off of the highest point of the cam. When the cam-roll drops off, the spring 29 will push down the igniter-rod 15, and thereby separate the contact-points, thus forming a spark. The movement of the igniter-rod 15 will be very nearly in a vertical line.

Fixed to the lower part of the cylinder 1 is a stand 30, on the outer end of which is a guide 31, through which the igniter-rod 15 passes. The under side of said guide forms an abutment for spring 29. Clamped to rod 15, as by a set-screw 32 or other means, is a collar 33, which engages with guide 31 in the downward stroke of rod 15 and limits its downward movement. The said collar is preferably so adjusted that when the cam-roll 21 drops off of the point 28 of the cam the rod 15 will not descend quite far enough to bring the said roll into contact with the cam, and it will be thus kept from contact until the cam revolves far enough to bring the incline of the cam around to the cam-roll.

The limiting of the movement of the igniter-rod, as described, prevents wear and also serves to limit the interval of separation of the contact-points of the electrodes.

On the arm 34 of the stand 30 is attached an arc-shaped arm 35, having a series of indentations 36, with any one of which a pin 37, projecting from the inner face of the arm 20 of the adjusting-lever, is fitted to engage and hold the said lever in its adjusted position. By adjusting the arm 20 to varying positions on the arc-shaped arm 35 the point in the revolution of the cam at which the cam-roll drops off will be varied, and thus the time of ignition will be varied. By turning the arm 20 to the left the ignition will occur earlier, and thus speed the engine, and by moving it to the right the ignition will occur later and slow the engine. A pin 38, projecting from the arm 35 near its outer end, forms a stop to prevent the arm 20 from being carried entirely off of the arm.

The arm 20 is sufficiently flexible to allow the pin 37 to be disengaged from any of the several indentations 36 and moved along the arm to be reëngaged at any point desired. The adjusting-lever being mounted on the same center as that on which the gear 12 and cam 22 revolve, the fulcrum 18, on which the bell-crank 16 17 is pivoted, being carried by the short arm 19 of the adjusting-lever, must move in an arc concentric with the gear and the cam, so that the inner end of the arm 16, to which the lower end of igniter-rod 15 is pivoted, never changes its alinement, and thus is always in best position for working.

The exhaust-rod 39 in the engine shown in the drawings is directly behind the igniter-rod 15, and therefore does not appear in Figs. 1 and 2.

The variable mechanism described can be utilized in connection with other mechanism than sparking mechanism where it is desired to vary the time of movement of a reciprocating rod with relation to other mechanism where variable intermittency is required, and it is intended to herein cover such application.

The adjusting-lever 20 is shown as pivoted on the same stud 13 as the cam 22; but it is not necessarily on the same stud. It may be on another stud concentric with the said cam.

What I claim is—

1. In combination with a reciprocable rod, a rotating cam on a fixed center, a lever pivoted to said rod and actuated by said cam to reciprocate said rod, a lever fulcrumed on the same fixed center as said cam, mechanism for holding said second lever at different angles with relation to said reciprocating rod when turned on its fulcrum, said first lever being pivoted to said second lever and thereby having a fulcrum which is moved according to the varying positions of adjustment of said second lever, the fixed fulcrum of said adjusting-lever causing the line of movement of the fulcrum of said first lever to be in the arc of a circle whose center is the fixed fulcrum of said adjusting-lever, thereby causing the said reciprocating rod to always move in the same path but variable as to time of movement with relation to the rotation of the cam, substantially as described.

2. In a gas or gasolene engine, in combination, with an igniter-rod, a rocking bell-crank lever, one arm of which is pivoted to said igniter-rod, a cam-roll mounted in the other arm of said bell-crank, a rotating cam with which said cam-roll engages and thereby rocks the bell-crank and reciprocates the igniter-rod, a stud on which said cam is mounted, an adjusting-lever fulcrumed on the same center as said cam, a stud on one arm of said adjusting-lever on which said bell-crank is fulcrumed, and an arc-shaped arm having means for engaging the other arm of said adjusting-lever and holding it in varying positions, thereby varying the relation of the cam-roll to the cam and varying the period in the revolution of the cam at which the igniter-rod will descend, and an ignition device which is operated by said rod, substantially as described.

3. In a gas or gasolene engine, in combination with a reciprocable igniter-rod, driving mechanism therefor, variable mechanism which controls the actuation of the igniter-rod to regulate and vary the time of reciprocation of said rod with relation to the driving mechanism, and connecting mechanism which causes the said igniter-rod to always move in the same alinement, and an ignition device which is operated by said rod, substantially as described.

4. In a gas or gasolene engine, in combination with a reciprocable igniter-rod, an ignition device operated thereby, a rotating cam on a stationary axis, a lever pivoted to said rod and actuated by said cam to reciprocate said rod, a lever fulcrumed on the same fixed center as said cam, mechanism for holding said second lever at different angles with relation to the igniter-rod when turned on its fulcrum, said first lever being pivoted to said second lever and thereby having a fulcrum which is moved according to the varying positions of adjustment of said second lever, the fixed fulcrum of said adjusting second lever causing the line of movement of the fulcrum of said first lever to be in the arc of a circle whose center is the fixed fulcrum of said adjusting-lever whereby said igniter-rod will always have the same alinement.

5. In a gas or gasolene engine, in combination with a reciprocable igniter-rod, an ignition device operated thereby, a rotating cam on a stationary axis, an adjusting-lever fulcrumed on the same center as said cam, a series of stops arranged concentrically with the fulcrum of said adjusting-lever and which engage with one arm of said lever and hold it in its adjusted positions, a rocking bell-crank lever fulcrumed to a second arm of said adjusting-lever, one arm of said bell-crank being pivoted to said igniter-rod and the other arm engaging with said cam whereby said igniter-rod is reciprocated, the movement of said adjusting-lever on its fulcrum moving the fulcrum of said rocking bell-crank lever in an arc concentric with the fulcrum of said adjusting-lever and thereby changing the relation of the said cam to said igniter-rod and changing the time of reciprocation of said igniter-rod without changing its path of movement, substantially as described.

In testimony whereof I have affixed my signature in presence of two witnesses.

GEORGE E. TREGURTHA.

Witnesses:
 JAMES TREGURTHA,
 FREDERICK S. MANN.